Jan. 14, 1941.  F. H. WATSON  2,228,619
COTTON GINNING METHOD AND APPARATUS
Filed June 22, 1937  3 Sheets-Sheet 1

Inventor
Frank H. Watson.
By Cushman Darby Cushman
Attorneys

Fig. 2.

Jan. 14, 1941.  F. H. WATSON  2,228,619
COTTON GINNING METHOD AND APPARATUS
Filed June 22, 1937  3 Sheets-Sheet 3

Inventor
Frank H. Watson
By Cushman, Darby & Cushman
Attorneys

Patented Jan. 14, 1941

2,228,619

UNITED STATES PATENT OFFICE 2,228,619

COTTON GINNING METHOD AND APPARATUS

Frank H. Watson, Jonesboro, Ark., assignor, by mesne and direct assignments, to Watson Centrifugal Cotton Gin Co., Bridgeport, Conn., a corporation of Connecticut Application June 22, 1937, Serial No. 149,751

41 Claims. (Cl. 19—48)

The present invention relates to cotton ginning method and apparatus.

The advantages of the new system are numerous. For one thing, the lint is not cut by reason of the fact that the usual ribs are eliminated, separation of the seed from the fibre being effected in the absence of positive restraint on the seed. Another advantage is that the mixing of seed at the gins and lint from one bale to another is avoided, since every seed and every fiber is discharged from the gin after feeding ceases. Another advantage is that in the preferred practice of the invention only the lint or spinnable cotton is removed from the seed, the linters remaining on the seed. Another important feature is that the production of so-called low sided bales is avoided for the reason that the trash is first discharged from the lint and the last lint that comes through may actually be cleaner than the first.

In order that the principles underlying the invention may be clearly understood, I have shown several illustrative embodiments in the accompanying drawings with reference to which the description will proceed.

Figure 1:
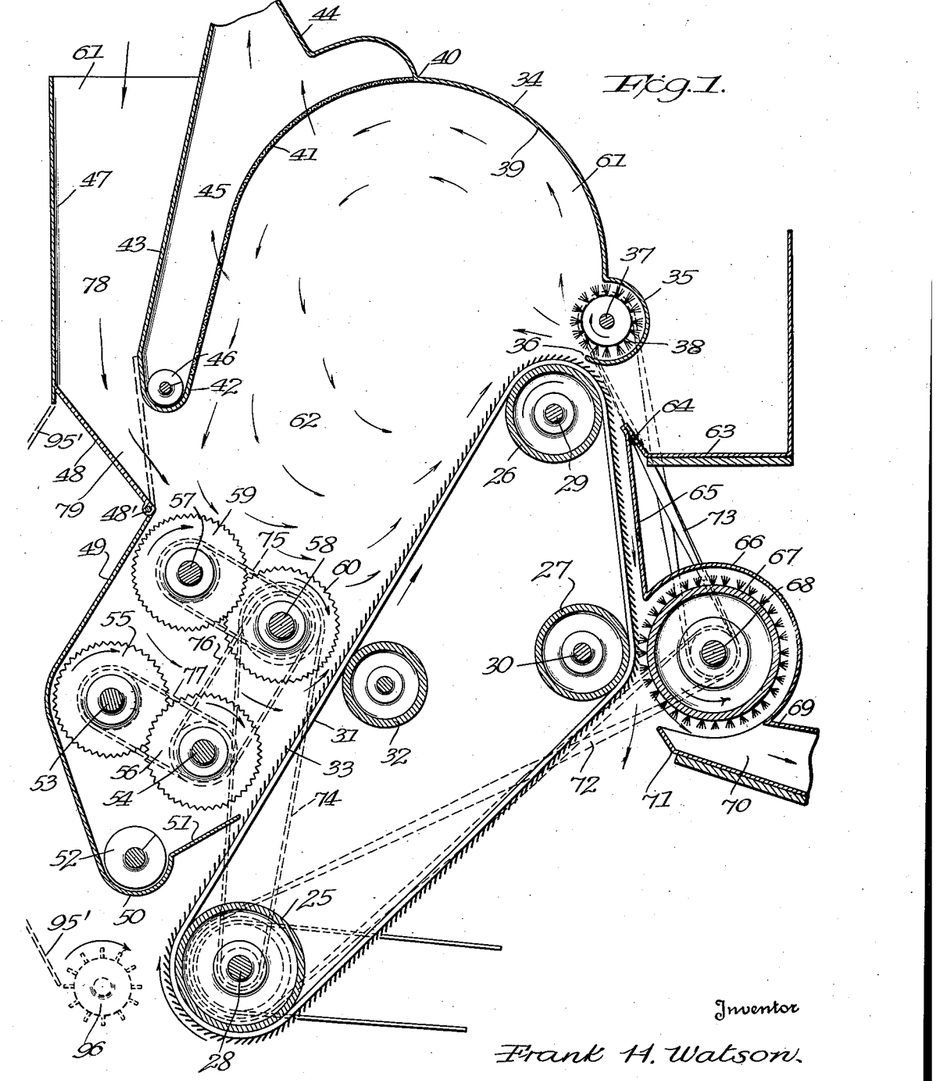
Figure 1 is a vertical section of a gin embodying the invention.

Referring first to Figure 1, reference numerals 25, 26 and 27 designate three pulleys or rolls mounted on the parallel shafts 28, 29 and 30 which may be journaled in any suitable frame. The pulleys are looped by an endless belt 31 which may be of any desired width, but preferably about fifty four inches, which is the width of the usual press box, the pulleys having a corresponding width.

The shafts are in triangular relation, so disposed that the straight run of the belt 31 extending between the left hand sides of the pulleys 25 and 26 is inclined at about a 35° angle to the perpendicular, although this relation may be varied as desired. The pulley 27 is offset to the right from the common plane of shafts 28 and 29 so as to deflect its associated run outwardly from a straight line of travel. Shaft 28 is preferably adjustable in the said plane in order to take up any slack which may develop in the belt 31. About midway between the pulleys 25 and 26 is a pulley 32 on which the lower side of belt 31 runs for the purpose of stabilization.

Figures 3, 4, 5, 6, 7, 8, 9, 10, 11, 12:
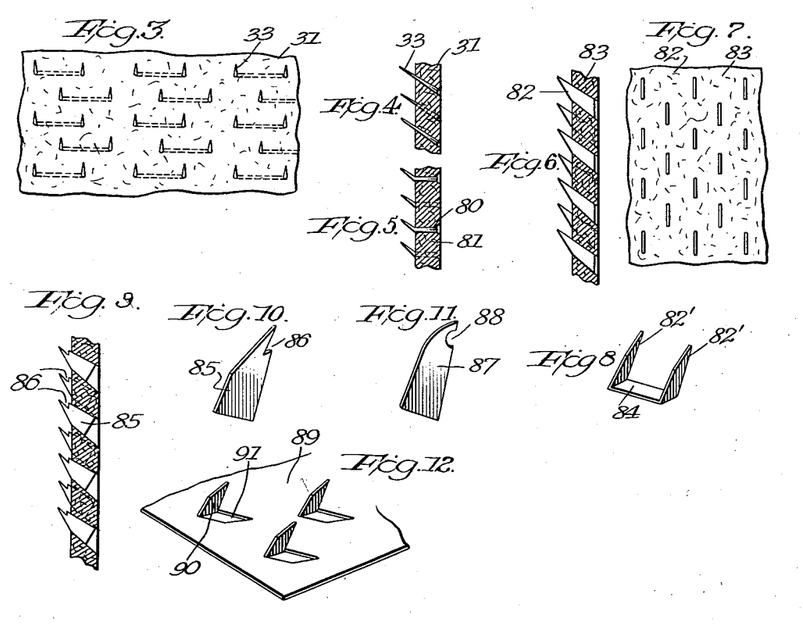
Figure 3 is a fragmentary plan view of a portion of a belt utilizable in the gins of Figures 1 and 2.
Figure 4 shows the belt of Figure 3 in section.
Figure 5 is a view similar to that of Figure 4 of another design of belt.
Figure 6 is a section similar to that of Figure 4 of a still further design of belt.
Figure 7 shows in plan the belt of Figure 6.
Figure 8 shows in perspective a double tooth which may be substituted for the single teeth of Figures 6 and 7.
Figure 9 shows another form of belt in longitudinal section.
Figure 10 shows in perspective a tooth such as appears in elevation in Figure 9.
Figure 11 shows in elevation a modified form of tooth.
Figure 12 is a fragmentary plan of still another form of belt.

The belt 31 is provided with a multiplicity of teeth 33 which are at such an angle to the outer surface of the belt as to point upwardly on the direct run between pulleys 25 and 26, as shown. These teeth may be constituted by points of staples as shown in Figures 3 and 4. As shown in those figures the staples are driven through from the back of the belt and their cross portions are received in grooves formed in the belt so that they will not contact the surfaces of the pulleys. The belt itself is desirably of leather, but may be of any suitable material, as will be understood. The projecting ends of the teeth are at an angle of about 45° to the belt surface as shown in Figure 4, and project for about a quarter of an inch. As shown in Figure 3, the teeth of each staple are about one-half inch apart and the staples are arranged in longitudinally staggered relation so that longitudinal rows, spaced about a quarter of an inch apart are provided. Longitudinally of the belt, each tooth is about one-half an inch from the next adjacent tooth and is similarly spaced from the next adjacent tooth transversely of the belt. While this arrangement is a preferred one, it may be departed from.

A casing 34 has a substantially semi-cylindrical portion 35 which is above pulley 26 with its lower edge 36 spaced slightly above the path of the teeth 33 at about the top of the belt loop. A suitably journaled shaft 37 supports a rotary brush 38 within the housing portion 35, the brush and casing portion extending from edge to edge of the belt 31. The housing portion 35 may be closed by end walls or may be left open, depending on whether or not it is desired to have a strong induced draft in addition to the action of the brush.

The housing 34 rises on a curve from the portion 35 to provide a deflecting wall portion 39 which is solid up to the point 40. Portion 39 is continued in a screen 41 which is curved downwardly to meet the inner edge of a trough 42 which forms a part of the casing and extends at least from edge to edge of the belt, as does the remainder of the casing. The outer edge of the trough 42 is continued upwardly in the casing portion 43 which is spaced from the screen and joins the portion 39 at 40. A suction flue 44 leads to an opening in the casing wall 43 for the withdrawal of matter from the chamber 45.

A conveyor screw or auger 46 in trough 42 and journaled on an axis parallel to shaft 29 is adapted to remove matter gathering in the trough.

Casing portion 43 forms one wall of a hopper whose opposite wall is constituted by a plate 47 which has an inwardly extending portion 48 terminating below and in spaced relation to the trough 42. From the lower edge of portion 48 a plate 49 extends downwardly substantially parallel to the adjacent run of belt 31 and is bent inwardly and around to form a trough 50 whose upper inner edge is extended at 51 to a line closely adjacent to the tips of teeth 33. A conveyor screw or auger 52 suitably journaled is operable in trough 50 for the purpose of removing matter from the latter.

A pair of suitably journaled shafts 53 and 54, above screw 52 and parallel thereto, carry a series of saws 55 and 56 which have straight teeth, i. e., not hooked, and the saws of the two series are slightly inter-leaved, as shown, with uniform spacing. The saws of each series are spaced apart around one-quarter to five-sixteenths of an inch and they substantially fill the space between wall 49 and the adjacent run of the belt. Similar shafts 57 and 58 above shafts 53 and 54 and opposite pulley 32 carry similar series of saws 59 and 60, the saws of each of these series, however, being spaced apart somewhat further than the saws of the series previously described. The diameter of the saws is such that they substantially fill the space between the wall 49 and the belt. The upper portions of the saws 59 and 60 in effect constitute a continuation of the hopper portion 48.

It will be understood that side walls, as at 61, are provided so that the casing provides, in conjunction with the belt, a substantially closed chamber 62.

Suitably supported to the right of the belt and below the casing portion 35 is a mote board 63 whose upturned edge 64 is spaced slightly from the path of the teeth. A plate 65 extends downwardly from the portion 64 in substantially parallel relation to the adjacent run of the belt and is bent to form a substantially semi-cylindrical housing 66 in which is mounted a brush 67 on a suitably journaled shaft 68 which is parallel to and opposite the shaft 30. The casing 66 is continued in a horizontally extending portion 69 which forms the top wall of a conduit 70 whose bottom wall is formed by a longitudinally adjustable plate or mote board 71 disposed beneath the brush. The conduit 70 leads to a condenser.

The power in-put may be through shaft 28 and the latter is driven, for example, at a speed of around 1250 R. P. M. in a clockwise direction. It is here contemplated that the pulley 25 has about a twelve inch diameter so that being driven at the speed mentioned the belt 31 is caused to travel at high speed, namely, around four thousand feet per minute. The pulley 26, as here contemplated, has about an eight inch diameter in order to give a sharper turn to the top loop of the belt. The shaft 68 may be driven from the shaft 28 by means of a belt 72 in a counter-clockwise direction and its speed may be from 3000 to 3500 R. P. M., that is, considerably higher than the speed of shaft 28. The shaft 37 of brush 38 may be driven from shaft 68 by means of belt 73 in a clockwise direction and at the same speed.

The shafts 57 and 58 may be driven from shaft 28 through belts 74 and 75 in a clockwise direction and at the same speed which may be 100 to 150 R. P. M. Shafts 53 and 54 may be driven from shaft 58 by means of belts 76 and 77, their direction and speed of rotation being the same as that of the drive shaft. Screws 46 and 52 may be driven in any suitable manner.

The speeds mentioned are, of course, subject to variation. They are given not as critical, but as typical, and any speeds which will give the results sought may be used.

With the apparatus set in motion, cotton is fed into the hopper 78 and passes through the throat 79 onto the saws 59 and 60 in chamber 62 to be passed by the saws toward belt 31. The spacing of the series of saws 59 and 60 is such that the locks cannot fall between them although loose trash can fall directly downwardly to be removed by the screw 52. As the locks reach the teeth 33 on belt 31 the lint is suddenly engaged by the latter and due to the inertia of the seed an instantaneous fiber loosening or detaching action takes place. That is to say, the lint on that side of the locks engaged by the teeth is either loosened from the seed or actually snatched therefrom. Any detached seed will be tumbled on the belt and will either be carried up to the top of pulley 26 or will be bounced back or gravitate onto the saws 59 and 60 to be returned again to the teeth 33. If sufficient lint has been removed, however, the partial locks may screen through between the saw series 59 and 60 to fall on the saw series 55 and 56, whose saws, it will be remembered, are spaced apart little more than the size of the normal seed so that the seed cannot screen through the series 55 and 56 unless the lint has been entirely removed. Consequently, any seed still retaining spinnable fibre is passed again to the teeth 33 where the ginning action is repeated. Some of the seed may be carried up past saws 60 and a part may remain in the space between saws 56 and 60 as a roll bearing against teeth 33 and undergoing an independent ginning action. However, any seed sufficiently denuded to screen through the saw series 55 and 56 pass to the screw 52 to be removed.

The locks retained on the teeth 33 move upwardly with the same at high velocity to the change of direction provided by the pulley 26. When the locks approach the top of pulley 26, the gripped lint continues on the teeth and around the pulley, whereas the seed, due to their inertia, fly off under centrifugal action and against the deflecting surfaces 39 and 41 by which they are returned to the screen saws, with the assistance of gravity, and the described ginning action is repeated as long as is necessary to completely remove the spinnable fibre.

It will be seen that there are two main phases of the ginning operation, namely, that phase in which the locks reach the belt and are suddenly moved by the teeth 33 from a condition of substantial rest, and that phase in which the gripped lint is given a sudden change in direction of movement to effect centrifugal separation of the seed, motes, and foreign matter. These phases occur respectively as the cotton reaches the teeth and as the gripped cotton approaches the top of pulley 26. Intermediate these two points there will ordinarily be some weight of unginned or partially ginned cotton bearing on the locks rising with the belt, and since this weight has a tendency to impede the movement of the locks with the teeth, there is a lint loosening or detaching phase intermediate the two main phases above mentioned. There may also be an independent ginning operation carried on just above the series of saws 56. However, there is in any case no positive restraint imposed on the seed such as occurs in the ordinary gin by reason of the ribs. Due to this and to the absence of the side action of the usual saws, nothing but the spinnable fibre is taken from the seed. The linters remain on the seed so that the gin output is of superior grade and spinning quality.

The brush 38, due to its positive action and also to any draft induced thereby, prevents any trash from passing out with the lint between the edge 36 and the belt 31. Fine trash is sucked through the screen 41 and through the flue 44, sand particles and the like falling into the trough 42 to be removed by the screw 46.

As the lint rounds the pulley 26 there is centrifugal mote discharge onto the board 63. The lint is removed by the brush 67 which is placed at the change of direction provided by the pulley 27, the shafts 30 and 68, as here shown, lying in the same horizontal plane. The brush deposits the lint on the bottom plate or mote board 71 of the conduit 70 through which it is passed to the condenser. There is a further centrifugal mote discharge in front of plate 71.

When feed is stopped the ginning operation is completed as to all cotton remaining in chamber 62, all seeds gravitating through the screening saws to the screw 52. In this connection it may be mentioned that while I have shown two superposed groups of screening saws, each group containing two series, the number of the series in each group may be increased or decreased and the number of groups may be increased or decrased and the spacing of the saws of each series may be graduated from the top to the bottom group in a manner to be most efficient. Also, in some cases, it may be desired to drive the leading saw series of a group at a speed higher than the speed of the succeeding series of the same group.

The incoming cotton being fed against the flat run of the belt 31 and centrifugal force being entirely absent at this point, the angle of the teeth causes them to pull the lint closely against the surface of the belt so that it is very completely engaged by the teeth. The whole mass is drawn to the belt, seeking to get in line with the plane of the teeth.

The teeth instead of being formed as the prongs of staple-like bodies, as in Figures 3 and 4, may be separately formed, and in this connection I may state that I have secured entirely satisfactory results in the use of ordinary phonograph needles.

In Figure 5 I have shown the teeth as constituted by the bent projecting portions of nails or pins 80 driven at right angles through the belt 81.

In Figures 6 and 7 the teeth 82 are formed of thin flat metal with a straight leading edge and an inclined rearward edge meeting the leading edge at a point. The teeth 82 are driven through the belt 83 to take the disposition particularly shown in Figure 6.

As shown in Figure 8 the teeth 82', similar in form to the teeth 82, are connected by a cross portion 84 so that a staple-like body is provided. As in the construction shown in Figures 3 and 4, the cross portion positively prevents displacement of the teeth under centrifugal action, but even in the absence of such anchoring portions I have found no tendency for the teeth to be thrown out. In a leather or like belt the teeth are very securely gripped, especially when they are of tapered form.

The teeth 85 shown in Figures 9 and 10 are generally similar in form to those of Figure 6, but are distinguished from the latter in being provided with a notch 86 whose bottom edge is slightly above the surface of the belt. This notch tends to hold the lint slightly away from the surface of the belt so that an improved cleaning action is secured, particularly on account of the draft induced by the brush 38, Figure 1. Since air can pass between the gripped lint and the belt surface, trapping of trash against the belt surface is prevented and its discharge facilitated.

The tooth 87 of Figure 11 has in general the same effect as the tooth 85 of Figure 10, being provided with a notch 88 whose lower edge tends to hold the lint away from the belt surface.

According to Figure 12 the belt 89 is constituted by a thin flexible endless ribbon of steel or other suitable metal from which the teeth 90, which may be similar in form to those shown in Figure 6, are struck or punched, leaving the openings 91.

Any trash which may find its way through the openings 91 may be removed by any suitable means such as an air current. On the other hand, any tendency of matter to pass through the openings 91 may be counteracted by a slight positive air pressure on the inner side of the working run of the belt. As another possibility the belt 89 may be lined to close the openings 91.

In all cases the tooth is preferably narrowed to a point from all directions.

Instead of a single belt extending the full width of pulleys or rolls, a number of separate belts, arranged side by side, can be used.

Figure 2:
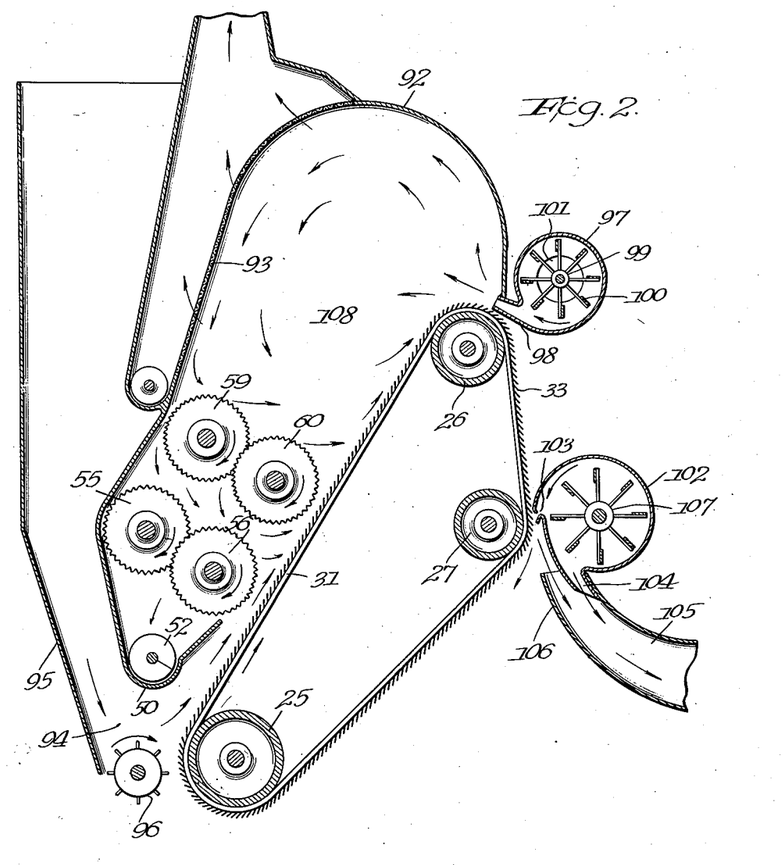
Figure 2 is a view similar to that of Figure 1 of a second embodiment.

In the embodiment shown in Figure 2 the parts which are the same as in the embodiment of Figure 1 have been given the same reference numerals. In this case the differently formed casing 92, including the screen 93, is continued uninterruptedly around the saw series 59, 60, and 55, 56, and the screw 52, and the lower surface of the trough 50 constitutes the top of a feed hopper throat 94, the outer wall of the hopper being shown at 95. The bottom of the throat is constituted by a spiked roller 96 which is spaced substantially from the belt 31 opposite and slightly below the center of pulley 25.

A fan housing 97 is connected into the casing chamber just above pulley 26, and has a nozzle 98 extending from edge to edge of the belt 31 with its lower rectilinear edge slightly spaced above the path of the teeth 33. A fan rotor 99 is mounted on a suitable shaft within the casing 97 and has arms carrying at their ends blades 100 which extend from end to end of the casing. The casing end walls are provided with air inlet openings as at 101 and these, if desired, may be made of adjustable capacity by means of suitable shutters or the like.

Opposite pulley 27 is a second blower casing 102 which has a slot 103 extending transversely of the belt throughout the width thereof in spaced relation to the path of the teeth and somewhat above the center of pulley 27. The casing 102 has a downwardly directed air discharge nozzle 104 which extends into the upper portion of a conduit 105 which leads to a condenser. The lower wall 106 of the conduit, this wall constituting a mote board, terminates upwardly in such spaced relation to the belt that the centrifugally discharged motes will pass between it and the belt. A rotor 107 similar to 99, above described, is operatively mounted in the housing 102. The two rotors are driven by any suitable means as is also the spiked roller 96, which latter is preferably driven at a speed of from 100 to 150 R. P. M. and in a clockwise direction.

In the operation of this embodiment, uncleaned cotton fed to the throat 94 is knocked by the spiked roller 96 toward the belt 31 and burrs are discharged downwardly between the belt and the spiked roller since they will not cling to the teeth 33.

The locks of cotton are caught by the teeth and the ginning operation proceeds as before, the outward passage of trash at the top of pulley 26 being prevented by the blast entering the chamber 108 through nozzle 98. In this case the blower takes the place of the brush 38 of the first embodiment.

The discharge of air through slot 103 detaches the lint from the teeth 33 and drives it downwardly. If the detached lint followed a straight line it would pass outside of the mote board, but the nozzle 104, discharging air above the mote board, creates a suction at the end of the mote board which draws the cotton into the conduit 105 and leaves any heavier matter such as motes to pass down in front of the mote board and to the floor. The blast from nozzle 104 propels the lint through conduit 105 to the condenser.

As contrasted to the embodiment first described, according to Figure 2, the incoming cotton is received through a passage below and separated from the screening saws and conveyor screw instead of being led in above the screening saws. The provision of these separate paths for the incoming cotton and delinted seed is of great value in preventing choking and in increasing the efficiency of the ginning operation. This feature is of particular importance in the treating of uncleaned cotton.

If desired the feeding features of Figures 1 and 2 may be combined together with by-pass means so that the cotton can be fed in above the screening saws as in Figure 1 or below them as in Figure 2, as desired. To refer to Figure 1, this can be easily done by making the casing portion 48 as a flap hinged on a horizontal axis at 48' so that it can be swung over against the lower part of casing portion 43, as shown in dotted lines, and by providing an extended hopper portion, of which a wall is indicated in dotted lines at 95', leading downwardly to the spiked roller 96, also shown in dotted lines. By moving the flap to one limit position or the other the cotton may be fed in above the saws 59 and 69 or beneath the trough 50.

It is believed that the principles underlying the new ginning system will be clearly understood from the above description of the various embodiments.

The utilization of inertia conditions of the seed instead of the usual saws and ribs is extremely advantageous. With the new gin the lint is neither broken nor cut and any length staple can be handled. The lint is removed practically instantaneously, but the linters are left behind. Dirt and sand are completely removed and practically all of the leaf without the use of cleaning machinery ahead of the gin. Naturally the product is of greatly increased value, since the fibre has its full length, is clean, and is free of linters.

Moreover, the new gin has a greatly increased capacity as compared to the old type and requires less power and care to operate and cannot be choked down. The new gin is very economical to build and is of enhanced utility, since it will gin any length staple, as above stated, will gin wet cotton perfectly, and will regin cotton samples, burned and damaged cotton, and waste. It can be installed in any standard gin plant. Especially in connection with the new roll former which replaces the tramper, great economy of plant construction and operating cost, and greatly enhanced operating efficiency are afforded.

With a gin mechanism substantially as illustrated in Fig. 1 and described herein, the speed of the belt 33 when employed with a pulley 26 having a diameter of 8 inches, should be substantially in excess of 2,000 feet per minute to give satisfactory ginning results. The results are increasingly more satisfactory as the belt speed is increased and very satisfactory results are secured at the speed hereinbefore set forth as 4,000 feet per minute which in the embodiment illustrated will rotate the pulley 26, at a speed of 1875 R. P. M.

According to well known physical laws, the force tending to detach a body such as a cotton seed, from the surface of a circular rotating body such as the surface of the belt portion which rides the pulley 26, is equal to the mass (weight) of the body multiplied by the velocity squared the result being divided by the radius of the rotating wheel or in the present case the pulley 26 plus the thickness of the belt. Therefore it will be clear from well known engineering principles that such seed separating force is in increased proportion to any decrease in the circumference of the pulley 26, with the same belt speed, it also being well known for instance as being set forth in "Technical Bulletin No. 503" of February, 1936, published by the Superintendent of Documents, for the U. S. Department of Agriculture, pages 4–7 inclusive, that cotton seeds commonly vary in weight according to the tables appearing in said publication, between extremes of .095 gram to .148 gram per seed.

It is also clear from the foregoing specification that without a substantially rapid deceleration of the rapidly moving seed particles as effected by the substantially abrupt deviation from a straight linear path there would be no substantial separation of seeds from the lint, and the curved path imparted to the belt as it rides upon the pulley 26 is effective in the embodiment of Fig. 1 to provide for the deviation from the straight path required to effect ginning action at this point. It will be understood that the above common formula for centrifugal force may be utilized to provide equivalent substitute c. g. s. units for the belt speed when pulleys of other sizes than that of the pulley 26 are employed and that such constructions are intended to be included with the scope of appended claims wherein belt and pulley speeds are set forth.

It will be understood that the described devices are susceptible of modification in details of form and construction and as to these variables I do not limit myself except as in the following claims.

I claim:

1. A cotton gin comprising an endless belt, pulleys engaged in end loops of said belt, means for imparting rapid movement to said belt through one of said pulleys, a multiplicity of teeth projecting from the outer face of said belt, means for directing cotton to a run of the belt between said pulleys so that the lint is engaged by said teeth and is carried around a loop of the belt whereat the seed is thrown off due to its inertia, and means for returning partially de-linted seed to the said run of the belt.

2. A cotton gin comprising an endless belt, pulleys engaged in end loops of said belt, means for imparting rapid movement to said belt through one of said pulleys, a multiplicity of teeth projecting from the outer face of said belt, means for directing cotton to a run of the belt between said pulleys so that the lint is engaged by said teeth and is carried around a loop of the belt whereat the seed is thrown off due to its inertia, and means for returning partially de-linted seed to the said run of the belt, said last-named means including screening means.

3. A cotton gin comprising an endless belt, pulleys engaged in end loops of said belt, means for imparting rapid movement to said belt through one of said pulleys, a multiplicity of teeth projecting from the outer face of said belt, means for directing cotton to a run of the belt between said pulleys so that the lint is engaged by said teeth and is carried around a loop of the belt whereat the seed is thrown off due to its inertia, and means for returning partially de-linted seed to the said run of the belt, said last-named means including screening means in the form of a coaxial series of spaced apart rotary saws.

4. A cotton gin comprising an endless belt, pulleys engaged in end loops of said belt, means for imparting rapid movement to said belt through one of said pulleys, a multiplicity of teeth projecting from the outer face of said belt, means for directing cotton to a run of the belt between said pulleys so that the lint is engaged by said teeth and is carried around a loop of the belt whereat the seed is thrown off due to its inertia, and means effective externally of said loop to create an air blast whereby to prevent loose trash from being carried therearound.

5. A cotton gin comprising an endless belt, vertically spaced pulleys in end loops of the belt and arranged on horizontal axes, said belt having between said pulleys a straight run which is inclined to the vertical, a multiplicity of teeth projecting from the outer face of said belt, means for imparting rapid movement to said belt through one of said pulleys, and means for directing cotton to said run of said belt so that the lint is engaged by said teeth and is carried around the top loop of the belt whereat the seed is thrown off substantially solely by the inertia effect of centrifugal force imparted to the seed carried by said top loop of belt embracing the uppermost pulley, the said inertia effect being at least that resulting from a belt speed of 2,000 feet per minute where the radius of curvature of said belt where said belt engages said uppermost pulley is approximately 4.125 inches.

6. A cotton gin comprising an endless belt, vertically spaced pulleys in end loops of the belt and arranged on horizontal axes, said belt having between said pulleys a straight run which is inclined to the vertical, a multiplicity of teeth projecting from the outer face of said belt, means for imparting rapid movement to said belt through one of said pulleys, means for directing cotton to said run of said belt so that the lint is engaged by said teeth and is carried around the top loop of the belt whereat the seed is thrown off due to its inertia, and a casing defining a chamber in conjunction with said run of said belt, said chamber including a deflecting wall for returning the thrown-off seed in a direction to be returned to said run.

7. A cotton gin comprising an endless belt, vertically spaced pulleys in end loops of the belt and arranged on horizontal axes, said belt having between said pulleys a straight run which is inclined to the vertical, a multiplicity of teeth projecting from the outer face of said belt, means for imparting rapid movement to said belt through one of said pulleys, means for directing cotton to said run of said belt so that the lint is engaged by said teeth and is carried around the top loop of the belt whereat the seed is thrown off due to its inertia, a casing defining a chamber in conjunction with said run of said belt, said chamber including a deflecting wall for returning the thrown-off seed in a direction to be returned to said run, and screening means cooperating with said deflecting wall to return partially de-linted seed to said run.

8. A cotton gin comprising an endless belt, vertically spaced pulleys in end loops of the belt and arranged on horizontal axes, said belt having between said pulleys a straight run which is inclined to the vertical, a multiplicity of teeth projecting from the outer face of said belt, means for imparting rapid movement to said belt through one of said pulleys, means for directing cotton to said run of said belt so that the lint is engaged by said teeth and is carried around the top loop of the belt whereat the seed is thrown off due to its inertia, a casing defining a chamber in conjunction with said run of said belt, said chamber including a deflecting wall for returning the thrown-off seed in a direction to be returned to said run, and screening means cooperating with said deflecting wall to return partially de-linted seed to said run, said screening means being constituted by a plurality of series of rotary saws arranged in superposed relation adjacent said run, the saws of the lower series being spaced apart so as to pass only the fully de-linted seed and the saws of the upper series being spaced apart so as to pass partially de-linted seed.

9. A cotton gin according to claim 8 wherein the feed is brought into said chamber onto the upper saw series.

10. A cotton gin according to claim 8 wherein the feed is brought into said chamber at a point below the lower saw series and in a path separate from the seed discharge.

11. A cotton gin comprising an endless belt, vertically spaced pulleys in end loops of the belt and arranged on horizontal axes, said belt having between said pulleys a straight run which is inclined to the vertical, a multiplicity of teeth projecting from the outer face of said belt, means for imparting rapid movement to said belt through one of said pulleys, means for directing cotton to said run of said belt so that the lint is engaged by said teeth and is carried around the top loop of the belt whereat the seed is thrown off due to its inertia, a casing defining a chamber in conjunction with said run of said belt, said chamber including a deflecting wall for returning the thrown-off seed in a direction to be returned to said run, and means for withdrawing trash from the upper portion of said chamber.

12. A cotton gin comprising an endless belt, vertically spaced pulleys in end loops of the belt and arranged on horizontal axes, said belt having between said pulleys a straight run which is inclined to the vertical, a multiplicity of teeth projecting from the outer face of said belt, means for imparting rapid movement to said belt through one of said pulleys, means for directing cotton to said run of said belt so that the lint is engaged by said teeth and is carried around the top loop of the belt whereat the seed is thrown off due to its inertia, a casing defining a chamber in conjunction with said run of said belt, said chamber including a deflecting wall for returning the thrown-off seed in a direction to be returned to said run, and means effective above said top loop to prevent loose trash from being carried therearound.

13. A cotton gin according to claim 1 wherein a further pulley engages the belt run opposite the feed-receiving run to deflect said opposite run outwardly from a straight line of travel, and wherein doffing means is provided effective on the belt teeth opposite said further pulley.

14. A cotton gin according to claim 1 wherein the teeth have notched forward edges, the lower edges of the notches being spaced slightly from the surface of the belt.

15. The method of ginning cotton which comprises the steps of feeding the locks to a rapidly moving lint gripping element, suddenly gripping the lint of the locks by said element and imparting rapid substantially straight-line movement to the locks while thus gripped, and abruptly changing the direction of movement of the gripping element, so that the seed are detached from the gripped lint due to the inertia of the seed.

16. The method of ginning cotton which comprises the steps of suddenly bringing the cotton from substantially a condition of rest to rapid substantially straight-line movement by a continuing positive propelling force imparted to the locks through the lint, and abruptly changing the direction of the propelling force and of the lint, whereby the seed is detached from the lint due to the inertia of the seed.

17. The method of ginning cotton which comprises the steps of suddenly gripping the lint of the locks and imparting rapid substantially straight-line movement to the gripped locks, abruptly changing the direction of movement, so that the seed are detached from the still gripped lint due to the inertia of the seed, and repeating the said steps until ginning is completed.

18. The method of ginning cotton which comprises the steps of suddenly gripping the lint of the locks and imparting rapid substantially straight-line movement to the gripped locks, abruptly changing the direction of movement, so that the seed are detached from the still gripped lint due to the inertia of the seed, and repeating the said steps by returning the seed and undetached lint through the original path until ginning is completed.

19. The method of ginning cotton which comprises the steps of suddenly bringing the cotton from substantially a condition of rest to rapid substantially straight-line movement by a continuing positive propelling force imparted to the locks through the lint, abruptly changing the direction of the propelling force and of the lint, whereby the seed are detached from the lint due to the inertia of the seed, and repeating the said steps until ginning is completed.

20. The method of ginning cotton which comprises the steps of suddenly bringing the cotton from substantially a condition of rest to rapid substantially straight-line movement by a continuing positive propelling force imparted to the locks through the lint, abruptly changing the direction of the propelling force and of the lint, whereby the seed are detached from the lint due to the inertia of the seed, and repeating the said steps by returning the seed and undetached lint through the original path until ginning is completed.

21. A cotton gin comprising an endless belt, spaced pulleys in end loops of the belt and arranged on horizontal axes, said belt having a straight run between said pulleys, a multiplicity of teeth projecting from the outer face of said belt, means for imparting rapid movement to said belt through one of said pulleys, means for directing cotton to said run of said belt so that the lint is engaged by said teeth and is carried around a loop of the belt whereat the seed is thrown off due to its inertia, a casing defining a chamber in conjunction with said run of said belt, said chamber including a deflecting wall for deflecting the thrown-off seed in a direction to be returned to said run, and screening means cooperating with said deflecting wall to return partially de-linted seed to said run, said screening means being constituted by a coaxially arranged series of rotary saws extending transversely of said run adjacent thereto.

22. Structure according to claim 21 wherein the deflecting wall is at least in part perforate and wherein a suction conduit is arranged externally of the perforate part of said wall so as to draw dirt particles through the latter.

23. Structure according to claim 21 wherein the feed is brought into said chamber on top of said saws.

24. Structure according to claim 21 wherein the directing means is arranged to deliver the cotton to said run below said saws.

25. Apparatus for separating the constituents of a mass which comprises fibres encumbered with relatively heavy matter, said apparatus comprising an endless belt, spaced pulleys in end loops of the belt arranged on horizontal axes, said belt having a straight run between said pulleys, a multiplicity of teeth projecting from the outer face of said belt, means for imparting rapid movement to said belt through one of said pulleys, means for directing said mass to said run of said belt so that fibres of the mass are gripped by said teeth and are carried around a loop of the belt whereat the heavy matter and any ungripped adherent fibres are thrown off due to the inertia of said heavy matter, means for doffing the gripped fibres, and a casing defining a chamber in conjunction with said run of said belt, said casing including a deflecting wall for deflecting the thrown-off matter in a direction to be returned to said run.

26. Apparatus for separating the constituents of a mass which comprises fibres encumbered with relatively heavy matter, said apparatus comprising an endless belt, spaced pulleys in end loops of the belt arranged on horizontal axes, said belt having a straight run between said pulleys, a multiplicity of teeth projecting from the outer face of said belt, means for imparting rapid movement to said belt through one of said pulleys, means for directing said mass to said run of said belt so that fibres of the mass are gripped by said teeth and are carried around a loop of the belt whereat the heavy matter and any ungripped adherent fibres are thrown off due to the inertia of said heavy matter, means for doffing the gripped fibres, a casing defining a chamber in conjunction with said run of said belt, said casing including a deflecting wall for deflecting the thrown-off matter in a direction to be returned to said run, and screening means cooperating with said deflecting wall to return said thrown-off matter with adherent fibres to said run.

27. Apparatus according to claim 25 wherein the deflecting wall is at least in part perforate and wherein a suction conduit is arranged externally of the perforate part of said wall so as to withdraw such of said thrown-off heavy matter as may pass through said perforate part.

28. The method of ginning cotton which comprises feeding the locks to a rapidly moving lint gripping element, gripping the lint by said element and snatching it from the seed as a result of the inertia of the seed and in the absence of positive restraint on the seed, and removing the lint from said element.

29. The method of ginning cotton which comprises feeding the locks to a rapidly moving lint gripping element, gripping the lint by said element, abruptly changing the direction of movement of said element so that the seed are discharged at said change of direction by centrifugal force while the lint is retained by said element, and removing the lint from said element.

30. The method of ginning cotton which comprises feeding the locks to a rapidly moving lint gripping element, gripping the lint by said element, abruptly changing the direction of movement of said element so that the seed are discharged at said change of direction by centrifugal force while the lint is retained by said element, removing the lint from said element, and repeating the said steps with respect to the discharged seed and any lint adhering thereto until ginning is completed.

31. The method of ginning cotton which comprises feeding the locks to a rapidly moving lint gripping element, gripping the lint by said element, abruptly changing the direction of movement of said element so that the seed are discharged at said change of direction by centrifugal force while the lint is retained by said element, removing the lint from said element, and repeating the said steps with respect to the discharged seed and any lint adhering thereto by returning the same through the original path until ginning is completed.

32. The method of ginning cotton which comprises feeding the locks to a rapidly moving lint gripping element by which it is suddenly gripped and brought to the speed of said element, abruptly changing the direction of movement of said element so that the seed are discharged at said change of direction by centrifugal force while the lint is retained by said element, and removing the lint from said element.

33. The method of ginning cotton which comprises feeding the locks to a rapidly moving lint gripping element by which it is suddenly gripped and brought to the speed of said element, abruptly changing the direction of movement of said element so that the seed are discharged at said change of direction by centrifugal force while the lint is retained by said element, removing the lint from said element, and repeating the said steps with respect to the discharge seed and any lint adhering thereto until ginning is completed.

34. The method of ginning cotton which comprises feding the locks to a rapidly moving lint gripping element by which it is suddenly gripped and brought to the speed of said element, abruptly changing the direction of movement of said element so that the seed are discharged at said change of direction by centrifugal force while the lint is retained by said element, removing the lint from said element, and repeating the said steps with respect to the discharged seed and any lint adhering thereto by returning the same through the original path until ginning is completed.

35. A cotton gin comprising an element having teeth adapted to grip the lint of cotton locks fed thereto, means for rapidly driving said element, said teeth having a circuitous course of travel wherein of the gripped locks the seed are discharged at a portion of said course where the direction thereof is arcuately curved by centrifugal force while the lint is retained by the teeth, and means disposed at a point in said course subsequent to said arcuately curved discharge portion of said course for doffing the lint from the teeth, the centrifugal force imparted to each seed being represented by the formula $$\frac{m \times v^2}{r}$$

$m$ being the mass of the seed ranging from .095 to .148 gram, $v$ the velocity imparted to said teeth and $r$ the radius of curvature of said curved portion of said course, and when so calculated for seeds of given mass is at least equaled by a resultant value achieved by said radius being 4.125 inches and a velocity of 2,000 feet per minute.

36. A cotton gin according to claim 35 wherein the element having teeth is constituted by an endless belt.

37. A cotton gin comprising an element having teeth adapted to grip the lint of cotton locks fed thereto, means for rapidly driving said element, said teeth having a curved course of travel wherein of the gripped locks the seed are discharged by centrifugal force while the lint is retained by the teeth, the centrifugal force imparted to each seed being represented by the formula $$\frac{m \times v^2}{r}$$

$m$ being the mass of the seed ranging from .095 to .148 gram, $v$ the velocity imparted to said teeth and $r$ the radius of curvature of said curved portion of said course, and when so calculated for seeds of given mass is at least equaled by a resultant value achieved by said radius being 4.125 inches and a velocity of 2,000 feet per minute, means for returning discharged partially delinted seed to said element for repeated action by the latter, and means for doffing the lint from the teeth.

38. A cotton gin according to claim 37 wherein the element having teeth is constituted by an endless belt.

39. A cotton gin comprising a rapidly moving conveyor adapted to support locks of unginned cotton disposed thereon, means for effecting movement of lock supporting portions of the conveyor in a circuitous path so abruptly changing direction at a predetermined point in the path as to cause cotton seed comprised in said locks due to inertia to break loose and be freely thrown from the lint portions of said locks, means on said conveyor for holding said lint portions of said locks to the conveyor supporting portions against substantial loss of lint at the point of abrupt change in path direction, and means in said path beyond said point of abruptly changed direction for receiving the remaining lint portions of said locks, the effective force of inertia imparted to each of said seeds at said direction changing point being at least equal to that expressed by the formula $$\frac{m \times v^2}{r}$$

whereof $m$ represents the mass of each seed, $v$ the velocity imparted to the locks by said movement effecting means, and $r$ the radius of curvature at said point of changing direction, where said velocity is in excess of 2,000 feet per minute, and said radius is approximately 4.125 inches.

40. A cotton gin comprising a rapidly moving conveyor adapted to support locks of unginned cotton disposed thereon, means for effecting movement of lock supporting portions of the conveyor in a circuitous path so abruptly changing direction at a predetermined point in the path as to cause cotton seed comprised in said locks due to inertia to break loose and be freely thrown from the lint portions of the locks, means comprising teeth on said conveyor for holding said lint portions of said locks to the conveyor supporting portions against substantial loss of lint at the point of abrupt change in path direction, and means in said path beyond said point of abruptly changed direction for receiving the remaining lint portions of said lock, the effective force of inertia imparted to each of said seeds at said direction changing point being at least equal to that expressed by the formula $$\frac{m \times v^2}{r}$$

whereof $m$ represents the mass of each seed, $v$ the velocity imparted to the locks by said movement effecting means, and $r$ the radius of curvature at said point of changing direction, where said velocity is in excess of 2,000 feet per minute, and said radius is approximately 4.125 inches.

41. A cotton gin comprising a rapidly moving conveyor adapted to support locks of unginned cotton disposed thereon, means for effecting movement of lock supporting portions of the conveyor in a circuitous path so abruptly changing direction at a predetermined point in the path as to cause cotton seed comprised in said locks due to inertia to break loose and be freely thrown from the lint portions of said locks, means on said conveyor for holding said lint portions of said locks to the conveyor supporting portions against substantial loss of lint at the point of abrupt change in path direction, and means in said path beyond said point of abruptly changed direction for receiving the remaining lint portions of said locks, said conveyor comprising an endless belt and belt guiding means comprising a pulley encompassed thereby and means guidingly supporting the belt to cause it, in a selected portion of its path, to substantially abruptly change its direction of movement, the effective force of inertia imparted to each of said seeds at said direction changing point being at least equal to that expressed by the formula $$\frac{m \times v^2}{r}$$

whereof $m$ represents the mass of each seed, $v$ the velocity imparted to the locks by said movement effecting means, and $r$ the radius of curvature at said point of changing direction, where said velocity is in excess of 2,000 feet per minute, and said radius is approximately 4.125 inches.

FRANK H. WATSON.